United States Patent [19]

Kanber et al.

[11] 4,139,806

[45] Feb. 13, 1979

[54] ACOUSTIC DRIVING OF ROTOR

[75] Inventors: Hilda Kanber; Isadore Rudnick, both of Los Angeles; Taylor G. Wang, Glendale, all of Calif.

[73] Assignee: The United States of America as represented by the Administrator National Aeronautics & Space Administration, Washington, D.C.

[21] Appl. No.: 812,447

[22] Filed: Jul. 5, 1977

[51] Int. Cl.² ............................................. H02N 11/00
[52] U.S. Cl. ........................................ 318/116; 60/721; 73/505; 310/322; 310/334; 310/20; 310/26
[58] Field of Search ............... 73/505; 74/5.7, 5 R; 308/10, 9, DIG. 1; 60/721; 310/2, 20, 26, 322, 334; 318/116, 118

[56] References Cited

U.S. PATENT DOCUMENTS

| | | | |
|---|---|---|---|
| 3,343,010 | 9/1967 | Snaper | 310/20 |
| 3,379,889 | 4/1968 | Barnett et al. | 74/5 X |
| 3,882,732 | 5/1975 | Wang et al. | 73/505 |

*Primary Examiner*—James J. Gill
*Attorney, Agent, or Firm*—Monte F. Mott; John R. Manning; Wilfred Grifka

[57] ABSTRACT

Sound waves are utilized to apply torque to a body in an enclosure of square cross section, by driving two transducers located on perpendicular walls of an enclosure, at the same frequency but at a predetermined phase difference such as 90°. The torque is a first order effect, so that large and controlled rotational speeds can be obtained.

6 Claims, 3 Drawing Figures

ACOUSTIC DRIVING OF ROTOR

ORIGIN OF THE INVENTION

The invention described herein was made in the performance of work under a NASA contract and subject to the provisions of Section 305 of the National Aeronautics and Space Act of 1958, Public Law 85-568 (72 Stat. 435; 42 USC 2457).

BACKGROUND OF THE INVENTION

The rotation of a body by means of sound waves has been known, as in U.S. Pat. No. 3,882,732 entitled "Material Suspension Within an Acoustically Excited Resonant Chamber" by Wang et al, but only as a higher order effect. That is, the sound waves produce an effect such as a general swirling of air in the chamber which tends to drag the body around, but with very little controlled torque being produced on the body.

SUMMARY OF THE INVENTION

In accordance with one embodiment of the invention, an apparatus and method are provided which enable the production of large and controlled torques and rotational speeds on a body through the use of acoustic energy. A body to be rotated lies in an enclosure of square cross sections, and acoustic energy is applied by a pair of transducers on perpendicular side walls of the enclosure. The two transducers are driven at the same frequency, but with a predetermined phase difference being maintained between them, such as 90°. It is found that this can produce considerable torque and rotational speeds on a body, with precision control.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
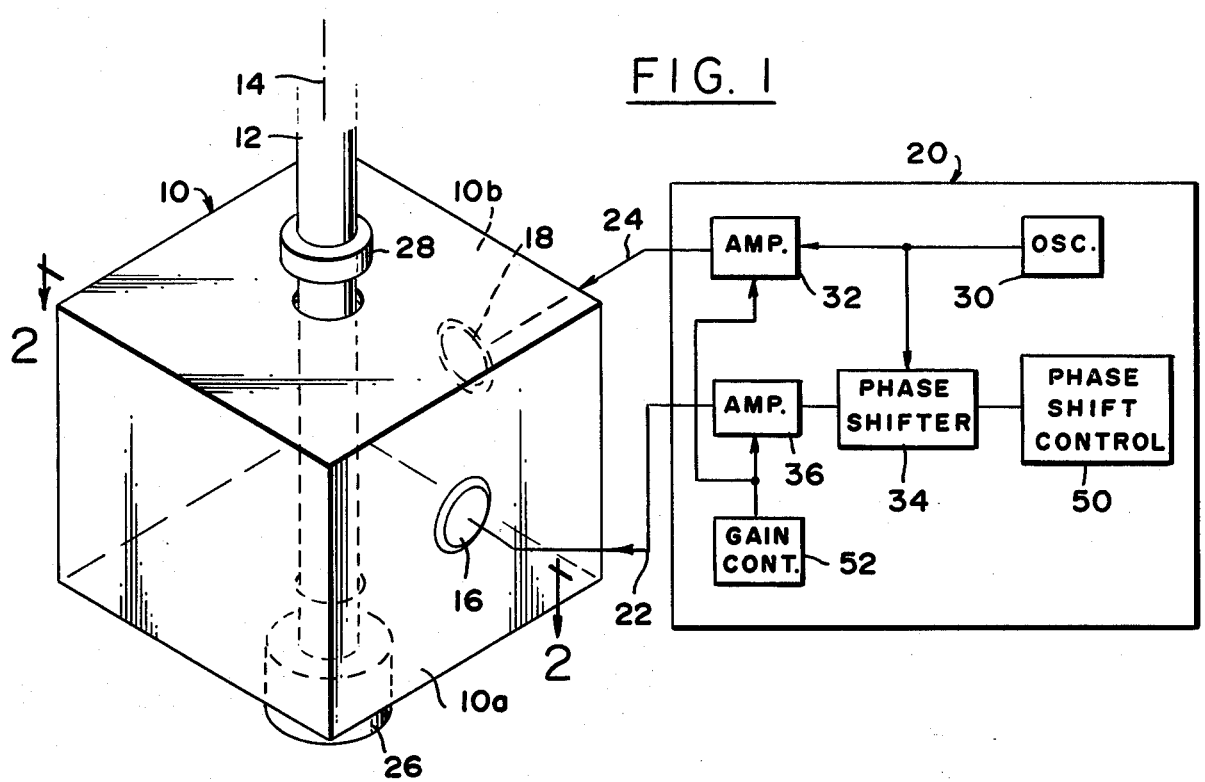
FIG. 1 is a perspective view of an acoustic rotational system constructed in accordance with the invention.

FIG. 1 illustrates an acoustic driving system which includes an enclosure 10 of square cross section, a rotor 12 extending perpendicular to the square cross section of the enclosure along an axis 14, and a pair of transducers 16, 18 mounted onto orthogonal walls 10a, 10b of the enclosure. The apparatus also includes a driving circuit 20 which supplies current over lines 22 and 24 that energize the transducers so they create sound waves of the same predetermined frequency, but with the sound emitted by the two transducers being out of phase with one another by a controlled amount. The sound waves produce a torque on the rotor 12, which is supported by a pair of bearings, 26, 28 to rotate.

The driving circuit 20 includes an oscillator 30 which generates an output of predetermined frequency, such as 1.6 kilohertz (kHz). The output of the oscillator is delivered to an amplifier 32 which, in turn, delivers a signal of the same frequency as the oscillator 30 over line 24 to the transducer 18. The output of the oscillator is also delivered to a phase shifter 34 which produces a predetermined phase shift, such as 90°, and which delivers its output to another amplifier 36. The output of the amplifier 36 is delivered through line 22 to transducer 16. Thus, the two transducers 16, 18 are both driven at the same frequency, but with a predetermined constant phase difference such as 90°. This results in the production of considerable torque on the portion of the rotor lying within the enclosure 10, and if the rotor is free to rotate this torque will cause rotation.

Figure 2:
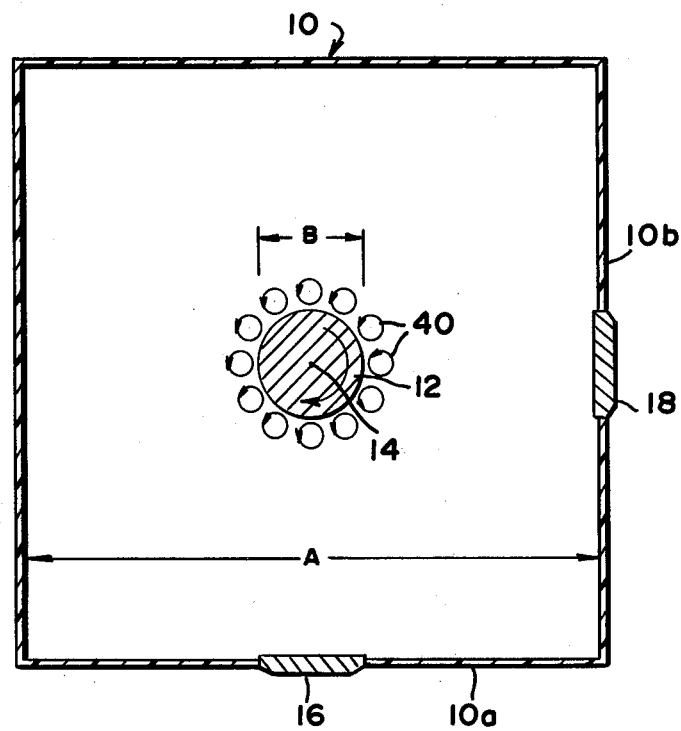
FIG. 2 is a view taken on the line 2—2 of FIG. 1.

FIG. 2 illustrates the manner in which the sound waves emitted by the transducers 16, 18 produce torque which tends to rotate the rotor 12. It is well known that particle motion in an intense sound field is generally linear. However, when two orthogonal modes are excited, as by the arrangement of FIG. 1 and 2, the motion of the particles is circular as indicated by the path lines 40 which represent the stream lines of particle motion. A gas such as air lies in the enclosure 10, and the circular motion of air particles adjacent to the outer surface of the rotor tends to produce rotation of the rotor due to the viscosity of the air. The force produced by the particles on the rotor surface is a first order effect, which results in a controlled torque and high rotation speeds for the rotor when high intensity sound waves are utilized.

Heretofore, it has been known that sound waves can produce torque on a body, but only as a higher order effect, as where the sound waves produce a movement of air about the body which results in some small and uncontrolled torque on the body. However, tests which have been produced utilizing an enclosure and rotor of the type illustrated in FIG. 1, but with the rotor suspended by a wire to permit torque measurements, have indicated first order effects. It might be expected that circular streaming of air around the rotor would occur to cause torque. However, when smoke was introduced, no evidence of streaming of the air around the rotor was observed. When the rotor is free to rotate, there is air rotation about the rotor, but it is the rotating rotor which produces the air stream, rather than vice versa.

Figure 3:
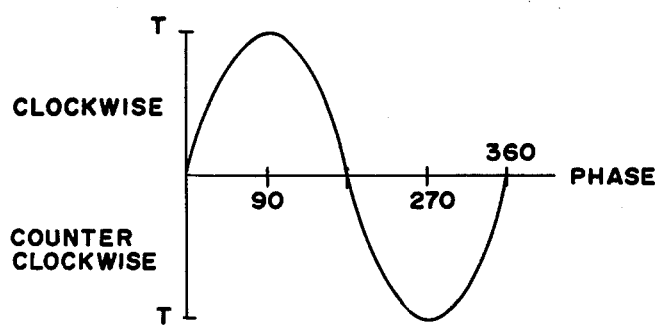
FIG. 3 is a graph showing the variation of torque with phase shift for the transducers of the apparatus of FIG. 1.

In one example of an acoustic rotor drive apparatus which has been constructed and tested, the enclosure had a width A (FIG. 2) of four and one-half inches, the rotor had a cylindrical portion extending through the enclosure with a diameter B of one inch. Each of the transducers 16, 18 were loud speakers and were driven at a frequency of 1.6 kHz, so that the wavelength in air was twice the width A of the chamber. The torque produced at a sound intensity of 140 dB varied with phase difference in a manner illustrated in FIG. 3, with the maximum torque T, occuring at 90° and 270° phase displacement, being approximately 180 gm-cm$^2$/sec$^2$. It can be seen that the torque varies sinusoidally with phase difference. In tests of velocity of a rotor, it was found that the speed of rotation also varied sinusoidally with phase angle in the manner depicted in FIG. 3. The torque and speed also vary with the intensity of the sound. Accordingly, in the circuit 20 of FIG. 1, a phase shift control 50 is provided to enable variation of the phase angle between the sonic output of the two transducers, and a gain control 52 is also provided to enable variation of the amplitude at which the transducers are driven, both transducers being driven at substantially the same amplitude. It may be noted that instead of using a drive frequency which produces a wavelength equal to twice the width of the square enclosure (fundamental frequency of the enclosure), it is possible to use a frequency which is a multiple integer of the fundamental frequency, in which case multiple rotation points will be provided at which shafts can be rotated.

Thus, the invention provides an apparatus which produces a controlled torque and which can rotate a body as a first order effect. This is accomplished by use of an enclosure of square cross section and by the use of transducers at orthogonal walls of the enclosure which are driven at a frequency resonant to the chamber, and wherein both transducers are driven at the same frequency but at a substantially different phase; the phase difference is normally plus or minus 90° in order to maximize the driving torque for a given sound intensity, and the torque or speed is controlled by controlling the intensity of currents to the transducers.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for rotating a body comprising:
 a chamber with first and second perpendicular walls, for surrounding at least a portion of said body;
 first and second transducers positioned to emit sound from said first and second walls, respectively; and
 means for driving said transducers;
 said driving means constructed to drive said first and second transducers at the same frequency but at a closely controlled phase difference controlled to lie within a limited range.

2. The apparatus described in claim 1 wherein:
 said driving means is constructed to drive said transducers at a constant 90° phase difference.

3. A rotating apparatus comprising:
 four walls forming a region of square cross section;
 first and second electrically energizable positioned to emit sound substantially perpendicular to first and second of said walls, respectively;
 oscillator means coupled to said first and second transducers for supplying currents thereto at the same frequency but at a predetermined substantially constant difference in phase.

4. The apparatus described in claim 3 wherein:
 said oscillator means supplies currents to said transducers which are approximately 90° out of phase with each other.

5. A method for rotating a body about a predetermined axis that passes through said body comprising:
 establishing a housing about the axis of said body; and
 emitting sound waves from two locations angularly spaced about said axis, so that the sound waves emitted from said locations are of the same frequency but out of phase with each other.

6. The method described in claim 5 wherein:
 said housing has a square cross section and the sound waves have a frequency which produces sound waves of a wavelength which is twice the width of said housing cross section.

* * * * *